United States Patent
Hashimoto

(10) Patent No.: US 6,170,446 B1
(45) Date of Patent: Jan. 9, 2001

(54) VALVE TIMING CONTROL SYSTEM FOR INTERNAL COMBUSTION ENGINE

(75) Inventor: Takeshi Hashimoto, Hyogo (JP)

(73) Assignee: Mitsubishi Denki Kaibushiki Kaisha, Tokyo (JP)

( * ) Notice: Under 35 U.S.C. 154(b), the term of this patent shall be extended for 0 days.

(21) Appl. No.: 09/441,665

(22) Filed: Nov. 17, 1999

(30) Foreign Application Priority Data

Jun. 2, 1999 (JP) ................................... 11-155454

(51) Int. Cl.[7] .............................. F02D 13/02; F02D 45/00

(52) U.S. Cl. ...................................... 123/90.15; 123/90.17

(58) Field of Search .............................. 123/90.15, 90.16, 123/90.17, 90.18

(56) References Cited

U.S. PATENT DOCUMENTS

| | | | |
|---|---|---|---|
| 5,333,577 | * 8/1994 | Shinojima | 123/90.15 |
| 5,562,071 | * 10/1996 | Urushihata et al. | 123/90.15 |
| 5,611,304 | * 3/1997 | Shinojima | 123/90.15 |
| 5,623,896 | * 4/1997 | Kato et al. | 123/90.15 |
| 5,937,808 | * 8/1999 | Kako et al. | 123/90.15 |

FOREIGN PATENT DOCUMENTS 6-299876  10/1994 (JP) ................................ F02D/13/02

* cited by examiner

*Primary Examiner*—Weilun Lo
(74) *Attorney, Agent, or Firm*—Sughrue, Mion, Zinn, Macpeak & Seas, PLLC

(57) ABSTRACT

A valve timing control system for an internal combustion engine, which precisely learns the maximum retard position thus making fine valve timing control possible. The control system includes a learning unit for learning a phase difference between the cam angle and the crank angle when a valve overlap between an intake valve and an exhaust valve is at a minimum, a learning instructions transmitting unit for transmitting to the learning unit, a learning instruction for learning the phase difference between the crank angle and the cam angle, and a valve timing control variable calculating unit for calculating a valve timing control variable, for varying the valve timing, on the basis of a deviation between the learned value and the present phase difference between the crank angle and the cam angle. The learning instruction transmitting unit is used only before shipment of a motor vehicle equipped with the internal combustion engine or upon mechanical inspection thereof. The learning unit learns the phase difference between the crank angle and the cam angle only when receiving the learning instruction from the learning instruction transmitting unit.

7 Claims, 16 Drawing Sheets

| DESIRED ENGINE SPEED (rpm) | 0 | 100 | 200 | ......... | 1900 | 2000 |
|---|---|---|---|---|---|---|
| BASE DUTY ON TIME (ms) | 0 | 0.2 | 0.4 | ......... | 3.8ms | 4ms |

$\Delta Ne$ = DESIRED ENGINE SPEED − ENGINE SPEED

| $\Delta Ne$ (rpm) | −250 | −200 | −150 | −100 | −50 | 0 | +50 | −100 | +150 | +200 | +250 |
|---|---|---|---|---|---|---|---|---|---|---|---|
| DUTY INCREASE/ DECREASE TIME (ms) | −0.5 | −0.4 | −0.3 | −0.2 | −0.1 | 0 | +0.1 | +0.2 | +0.3 | +0.4 | +0.5 |

CROSS-SECTIONAL VIEW TAKEN ALONG X-X LINE

CROSS-SECTIONAL VIEW TAKEN ALONG Y-Y LINE

CROSS-SECTIONAL VIEW TAKEN ALONG Z-Z LINE

VALVE TIMING CONTROL SYSTEM FOR INTERNAL COMBUSTION ENGINE

BACKGROUND OF THE INVENTION

1. Field of the Invention

The present invention relates to valve timing control for an internal combustion engine, which is made to learn a maximum retardation position in the valve timing.

2. Description of the Related Art

Conventionally, an apparatus is known which variably controls the valve timing of at least the intake valves or the exhaust valves according to engine operating conditions.

In addition, a system for controlling such an apparatus is well known, as disclosed in Japanese Patent Application Laid-open No. 9-345264. Referring to FIGS. 11 to 19, a description will be made hereinbelow of a conventional valve timing control system for an internal combustion engine.

FIG. 11 schematically shows the configuration of an internal combustion gasoline engine system having a common variable valve timing actuator.

In FIG. 11, an internal combustion engine 1 is composed of a plurality of (for example, four) cylinders which constitute a main body thereof. In this illustration, only one cylinder of the internal combustion engine 1 is shown.

A cylinder block 2 forms a cylinder portion of the internal combustion engine 1. A cylinder head 3 is connected to a top portion of the cylinder block 2.

A piston 4 is accommodated in each of the cylinders in the cylinder block 2, and is made to reciprocate up and down. A crank shaft 5, being connected to a lower end portion of the piston 4, is driven to rotate in accordance with the vertical movements of the piston 4.

A crank angle sensor 6 is made up of an electromagnetic pickup installed in the vicinity of the crank shaft 5, and outputs a crank angle signal SGT in synchronism with the rotation of the crank shaft 5 of the internal combustion engine 1. The crank angle signal SGT is used for detecting the speed Ne of the internal combustion engine 1 and further for detecting if the crank shaft 5 is at a predetermined reference crank angle (degCA).

A signal rotor 7 is connected integrally with the crank shaft 5, and has, at its outer circumference, two teeth 7a made of a magnetic substance and arranged at an interval of 180° rotation angle. The crank angle sensor 6 generates a pulse-like crank angle signal SGT whenever either of the teeth 7a passes in front of the crank angle sensor 6.

A combustion chamber 8 is defined by an inner wall of the cylinder block 2, an inner wall of the cylinder head 3 and the top of the piston 4, and an air-fuel mixture introduced into the internal combustion engine 1 is combusted therein. An ignition plug 9 is installed in the top portion of the cylinder head 3 such that it protrudes into the interior of the combustion chamber 8, and ignites the air-fuel mixture by discharging.

A distributor 10 is connected to an exhaust side cam shaft 20 (which will be described herein later) in the cylinder head 3, and successively applies a high voltage for ignition to the ignition plug 9 of each of the cylinders. An igniter 11 generates the high ignition voltage.

Each of the ignition plugs 9 is coupled through a high-tension cord (not shown) to the distributor 10, and the high voltage output from the igniter 11 is distributed through the distributor 10 to each of the ignition plugs 9 in synchronism with the rotation of the crank shaft 5.

A water temperature sensor 12 is located in the cylinder block 2 to sense the temperature W of a coolant (coolant temperature) flowing in a coolant passage. An intake port 13 is provided on the intake side of the cylinder head 3, while an exhaust port 14 is provided on the exhaust side of the cylinder head 3.

An intake passage 15 communicates with the intake port 13, while an exhaust passage 16 communicates with the exhaust port 14. An intake valve 17 is placed in the intake port 13 of the cylinder head 3, while an exhaust valve 18 is placed in the exhaust port 14 of the cylinder head 3.

An intake side cam shaft 19 is situated above the intake valve 17 to open and close the intake valve 17, while an exhaust side cam shaft 20 is situated above the exhaust valve 18 to open and close the exhaust valve 18.

An intake side timing pulley 21 is mounted on one end portion of the intake side cam shaft 19, while an exhaust side timing pulley 22 is mounted on one end portion of the exhaust side cam shaft 20. A timing belt 23 makes a connection of the timing pulleys 21, 22 to the crank shaft 5. Each of the cam shafts 19, 20 is made to rotate at a speed being ½ of that of the crank shaft 5.

In an operation of the internal combustion engine 1, the rotational drive force of the crank shaft 5 is transmitted through the timing belt 23 and the timing pulleys 21, 22 to the cam shafts 19, 20 so that the cam shafts 19, 20 rotate.

Thus, the intake valve 17 and the exhaust valve 18 are driven to open and close in synchronism with the rotation of the crank shaft 5 and the vertical movements of the piston 4.

That is, the valves 17 and 18 are driven at predetermined opening and closing timings in synchronism with a series of four strokes: an intake stroke, a compression stroke, an explosion (expansion) stroke and an exhaust stroke, in the internal combustion engine 1.

A cam angle sensor 24 is installed in the vicinity of the intake side cam shaft 19, and outputs a cam angle signal SGC for detecting an operating timing (valve timing) of the intake valve 17.

A signal rotor 25 is integrally connected to the intake side cam shaft 19, and has, at its outer circumference, four teeth 25a made of a magnetic substance arranged at intervals of a 90° rotational angle. The cam angle sensor 24 outputs a pulsed cam angle signal SGC whenever any of the teeth 25a passes in front of the cam angle sensor 24.

A throttle valve 26 is installed in the middle of the intake passage 15 and is operated by the accelerator pedal (not shown) to open and close, thereby adjusting the air flow rate into the internal combustion engine 1, that is, an intake air amount Q.

A throttle sensor 27 is connected to the throttle valve 26 to sense the throttle opening degree θ.

An intake air amount sensor 28 is placed on the upstream side of the throttle valve 26 to detect the intake air amount Q flowing in the intake passage 15 according to, for example, a thermal method.

A surge tank 29 is formed on the downstream side of the throttle valve 26 to suppress the intake pulsation.

Each of injectors 30 is individually placed in the vicinity of the intake port 13 of each of the cylinders to inject fuel so that an air-fuel mixture is supplied into the interior of the combustion chamber 8. Each of the injectors 30 is composed of a solenoid valve which assumes an open condition in response to energization. The injector 30 receives the supply of fuel sent under pressure from a fuel pump (not shown).

In the operation of the internal combustion engine 1, simultaneously with the introduction of air into the intake passage 15, each of the injectors 30 injects fuel into the intake port 13.

As a result of this, an air-fuel mixture is produced in the intake port 13, and is introduced upon the opening of the intake valve 17 into the combustion chamber 8 during the intake stroke.

A variable valve timing actuator (which will be referred to hereinafter as a VVT actuator) 40 is connected to the intake side cam shaft 19, and is driven by an operating oil (lubricating oil) to change the valve timing (i.e., opening and closing) of the intake valve 17 and/or the exhaust valve 18.

The VVT actuator 40 changes the displacement angle of the intake side cam shaft 19 with respect to the intake side timing pulley 21, thereby changing the valve timing of the intake valve 17.

An oil control valve (which will be referred to hereinafter as an OCV) 80 supplies the operating oil to the VVT actuator 40, and also adjusts the amount of the operating oil supplied thereto.

An electronic control unit (which will be referred to as an ECU) 100 is composed of a microcomputer (which will be described herein later), and is designed to drive various types of actuators (the injectors 30, the igniter 11, the OCV 80 and the like) on the basis of various sensor signals (the intake air amount Q, the throttle opening degree θ, the coolant temperature W, the crank angle signal SGT, the cam angle signal SGC and the like) representative of operating conditions of the internal combustion engine 1, thus controlling the fuel injection amount, the ignition timing, the valve timing and the like in the internal combustion engine 1.

Secondly, referring to FIGS. 12 to 17, description will be made hereinbelow of the concrete configuration of a variable valve timing mechanism including the VVT actuator 40 and the OCV 80.

FIG. 12 is a cross-sectional view showing a configuration in the vicinity of the intake side cam shaft 19 with the WT actuator 40 installed. In this illustration, a configuration of an operating oil supply mechanism (OCV 80) for driving the VVT actuator 40 is also shown.

In FIG. 12, parts identical to those mentioned above are marked with the same reference numerals. The VVT actuator 40 adjusts the intake valve timing, while the OCV 80 controls the amount of the operating oil to be supplied to the VVT actuator 40. The intake side timing pulley 21 rotates in synchronism with the crank shaft 5 through the timing belt 23 which rotates together with the crank shaft 5.

Through the VVT actuator 40, the rotation of the intake side timing pulley 21 is transmitted to the intake side cam shaft 19.

A bearing 41 is fixedly secured to the cylinder head 3 (see FIG. 11) to support the intake side cam shaft 19 rotatably.

A first oil passage 42 and a second oil passage 43 are provided in the intake side cam shaft 19 and a rotor 52 (which will be described herein later).

The first oil passage 42 communicates with a retarding chamber 62 (which will be described herein later) which is for shifting the rotor 52 in a retardation direction, while the second oil passage 43 communicates to an advancing chamber 63 (which will be described herein later) for shifting the rotor 52 in an advance direction.

An oil pump 91 pumps the operating oil (lubricating oil) from an oil pan 90 which stores the operating oil, and an oil filter 92 purifies the pumped operating oil. The oil pan 90, the oil pump 91 and the oil filter 92 constitute a lubricating means for lubricating the moving parts of the internal combustion engine 1 (see FIG. 11), and constitutes a means for supplying operating oil to the VVT actuator 40 in cooperation with the OCV 80.

Various types of sensors 99 include the aforesaid crank angle sensor 6 and the like provided in conjunction with the internal combustion engine 1, and input to the ECU 100 various sorts of operating conditions information of the internal combustion engine 1 such as the crank angle signal SGT.

A spool valve 82 slides within a housing 81 of the OCV 80. A linear solenoid 83 causes the spool valve 82 to slide in accordance with a control signal from the ECU 100. A spring 84 biases the spool valve 82 in a direction opposite the direction of the linear solenoid 83.

Ports 85 to 87, 88a and 88b are formed in the housing 81.

The supply port 85 communicates through the oil filter 92 to the oil pump 91, while an A port 86 communicates to the first oil passage 42, a B port 87 communicates with the second oil passage 43, and the discharge ports 88a, 88b are coupled to the oil pan 90.

In the operation of the internal combustion engine 1, when the oil pump 91 operates in connection with the rotation of the crank shaft 5, the operating oil in the oil pan 90 is sucked and discharged therefrom.

The operating oil discharged is sent through the oil filter 92 and selectively supplied to the oil passages 42, 43 by the OCV 80.

The oil amounts in the oil passages 42, 43 are increased/decreased in a manner such that the opening degrees of the ports 86, and 87 are varied continuously by the sliding motion of the spool valve 82. At this time, each port opening degree is determined by a current value i (controlled variable) to be applied to the linear solenoid 83.

The ECU 100 controls the current i to be given to the linear solenoid 83 on the basis of signals from various types of sensors such as the crank angle sensor 6 and the cam angle sensor 24.

A housing 44 of the VVT actuator 40 is installed to be rotatable relative to the intake side cam shaft 19, while a case 45 is fixedly secured to the housing 44.

A back spring in the form of plate spring 46 is located between a tip seal 49 (which will be described herein later) and the case 45 to press the tip seal 49 against the rotor 52 (which will be described herein later).

A cover 47 is fixed through a bolt 48 to the case 45. The bolt 48 fixes the housing 44, the case 45 and the cover 47.

The tip seal 49 is pressed against the rotor 52 by the back spring 46 to prevent movement of the operating oil between hydraulic chambers defined by the rotor 52 and the case 45. A plate 50 is fixed through a screw 51 to the cover 47.

The rotor 52 is fixed to the intake side cam shaft 19, and is located to be rotatable relative to the case 45.

A column-like holder 53 is provided in the rotor 52, and has a recess portion which engages with a plunger 54 (which will be described herein later).

The plunger 54 comprising a projecting member is caused slide within the housing 44 by the resiliency of a spring 55 (which will be described hereinbelow) and an oil pressure introduced into the holder 53.

The spring 55 biases the plunger 54 toward the rotor 52. A plunger oil passage 56 accepts the operating oil for applying an oil pressure to the plunger 54 against the biasing force of the spring 55. An air hole 57 normally sets the spring 55 side of the plunger 54 at atmospheric pressure.

A connecting bolt 58 fixedly connects the intake side cam shaft 19 and the rotor 52. Further, a shaft bolt 59 fixedly connects the intake side cam shaft 19 and the rotor 52 through rotational axes thereof. The shaft bolt 59 is placed to be rotatable with respect to the cover 47.

An air passage 60 is formed in the shaft bolt 59 and the intake side cam shaft 19 to set the inner side of the plate 50 at a pressure equal to atmospheric pressure.

FIG. 13 is a partial cross-sectional view showing a state where oil pressure is applied through the plunger oil passage 56 to the plunger 54.

As FIG. 13 shows, the plunger 54 is pressed to the housing 44 side by the oil pressure while compressing the spring 55, whereupon, the plunger 54 and the holder 53 are released from their engagement, so that the rotor 52 becomes rotatable with respect to the housing 44.

FIG. 14 is a cross-sectional illustration taken along the line X—X of FIG. 12 as viewed from the arrows, FIG. 15 is a partial cross-sectional view showing a shifted state of a slide plate, FIG. 16 is a cross-sectional illustration taken along the line Y—Y of FIG. 12 as viewed from the arrows, and FIG. 17 is a cross-sectional illustration taken along the line Z—Z of FIG. 12 as viewed from the arrows.

In FIGS. 14 to 17, the bolt 48 engages in a bolt hole 61. The retarding chamber 62 rotates first to fourth vanes 64 to 67 (which will be described herein later), integrated with the rotor 52, in the retardation direction.

The retarding chambers 62 are provided so as to be surrounded by the rotor 52, the case 45, the cover 47 and the housing 44, and the correspond to the first to fourth vanes 64 to 67 respectively. Further, the retarding chambers 62 communicate with the first oil passage 42 to receive the operating oil through the first oil passage 42.

The sector-shaped advancing chambers 63 also rotate the first to fourth vanes 64 to 67. The advancing chambers 63 are provided so as to be surrounded by the rotor 52, the case 45, the cover 47 and the housing 44, and corresponding to each of the first to fourth vanes 64 to 67 respectively. The advancing chambers 63 communicates with the second oil passage 43 to receive the operating oil through the second oil passage 43.

In accordance with the amount of operating oil supplied to the retarding chamber 62 and the advancing chamber 63, the rotor 52 shifts relative to the housing 44 so that the respective volumes of the retarding chambers 62 and advancing chambers 63 can be varied.

The first vane 64 is formed to protrude radially outward from the rotor 52. The holder 53 is fitted in the housing 44 side of the first vane 64, while a communication oil passage 70 (which will be described herein later) is recessed in the cover 47 side thereof.

In the middle of the communication oil passage 70, a shift groove 72 (which will be described herein later) is recessed. The plunger oil passage 56 passes through from the shift groove 72 through the holder 53 to the housing 44 side.

Each of the second to fourth vanes 65 to 67 is formed to protrude radially and outwardly from the rotor 52.

A tip seal 73 (which will be described herein later) is provided at the portions of each of the first to fourth vanes 64 to 67 that come into contact with the case 45.

A vane supporter 68 constitutes a central portion of the rotor 52. A shoe 69 is formed to protrude radially inward from the case 45. The shoe 69 has the bolt hole 61 which receives the bolt 48, and the tip seal 49 is provided at a portion of the shoe 69, and comes into contact with the vane supporter 68.

The communication oil passage 70 communicates to a space between the retarding chamber 62 and the advancing chamber 63 located at either side of the first vane 64. The slide plate 71 moves within the shift groove 72 (which will be described herein later) provided in the middle of the communication oil passage 70.

The communication oil passage 70 is partitioned by the slide plate 71, thereby preventing oil leakage between the retarding chamber 62 and the advancing chamber 63.

The slide plate 71 shifts toward the advancing chamber 63 side (see FIG. 14) when the oil pressure in the retarding chamber 62 is high, while moving toward the retarding chamber 62 side (see FIG. 15) when the oil pressure in the advancing chamber 63 is high.

The shift groove 72 is recessed in the middle of the communication oil passage 70, and the plunger oil passage 56 communicates with an intermediate portion of the shift groove 72.

The plunger oil passage 56 communicates with the retarding chamber 62 when the slide plate 71 shifts to the advancing chamber 63 side (see FIG. 14), while communicating with the advancing chamber 63 when the slide plate 71 moves to the retarding chamber 62 side (see FIG. 15).

The tip seal 73 is provided for each of the first to fourth vanes 64 to 67 to accomplish the sealing between each of the vanes 64 to 67 and the case 45, thereby preventing the oil leakage.

Arrows in FIGS. 14, 16 and 17 signify a direction of rotation of the entire VVT actuator 40 by the timing belt 23 and the like.

Furthermore, a description will be given hereinbelow of concrete operations of the VVT actuator 40 and the OCV 80.

First of all, when the internal combustion engine 1 is in the stopping condition, as shown in FIG. 14, the rotor 52 is at the maximum retardation position (that is, it is driven rotationally to a maximum in the retardation direction relatively with respect to the housing 44).

In the following description, the valve timing to be taken when the rotor 52 is at a position most retarded will be referred to as being at a maximum retardation position, and the phase difference (advance amount) between an intake side cam angle and a crank angle when the valve timing is at the maximum retardation position will be referred to as a maximum retardation value.

At this time, since the oil pressure supplied from the oil pump 91 to the OCV 80 is low (or the atmospheric pressure), the oil pressure is not applied to the first oil passage 42 and the second oil passage 43.

Thus, because of no supply of the oil pressure to the plunger oil passage 56, as shown in FIG. 12, the plunger 54 is pressed against the holder 53 due to the biasing force of the spring 55 so that the plunger 54 and the holder 53 are in engagement relation to each other.

Subsequently, when the internal combustion engine 1 starts, the oil pump 91 operates to cause the oil pressure to be given to the OCV 80 to rise, so that the oil pressure is applied through the A port 86 to the retarding chamber 62. In this case, owing to the oil pressure in the retarding chamber 62, the slide plate 71 shifts to the advancing chamber 63 side, which makes a communication between the retarding chamber 62 and the plunger oil passage 56.

The plunger 54 is then pushed and moved to the housing 44 side so that the plunger 54 and the rotor 52 are released from their engagement.

Nevertheless, since the oil pressure is supplied to the retarding chamber 62, the vanes 64 to 67 are brought into contact with the shoe 69 in the retardation direction and pressed thereagainst. Accordingly, even if the engagement by the plunger 54 is terminated, the housing 44 and the rotor 52 are pressed against each other by the oil pressure in the retarding chamber 62, thus reducing or eliminating vibrations or impacts.

Next, when the B port 87 is opened to advance the rotor 52, since the operating oil is supplied through the second oil passage 43 to the advancing chamber 63, the oil pressure is transmitted from the advancing chamber 63 to the communication oil passage 70 so that the slide plate 71 is pushed by the oil pressure and is shifted to the retarding chamber 62 side.

Owing to the shifting of the slide plate 71, the plunger oil passage 56 communicates with the advancing chamber 63 side of the communication oil passage 70 so that the oil pressure is transmitted from the advancing chamber 63 to the plunger oil passage 56.

As shown in FIG. 13, due to this oil pressure, the plunger 54 moves to the housing 44 side against the biasing force of the spring 55, thereby releasing the plunger 54 and the holder 53 from their engagement.

Thus, the A port 86 and the B port 87 are opened/closed to adjust the oil amount to be supplied in a state where the plunger 54 and the holder 53 are released from their engagement, so that the oil amounts in the retarding chamber 62 and the advancing chamber 63 are adjusted to advance or retard the rotation of the rotor 52 with respect to the rotation of the housing 44.

Furthermore, referring to FIG. 18, a description will be given hereinbelow of a valve timing detecting operation.

FIG. 18 is a timing chart showing a crank angle signal SGT, a cam angle signal SGCd at the maximum retardation and a cam angle signal SGCa at advance, that is, showing a phase relationship among the crank angle signal SGT and the cam angle signals SGCd and SGCa and a method for calculation processing of a real valve timing Ta.

The ECU 100 measures a period T of the crank angle signal SGT and further measures a phase difference time ΔTa from the cam angle SGCa to the crank angle signal SGT.

In addition, according to the following equation (1), the ECU 100 calculates a maximum retardation value Td on the basis of a phase difference time ΔTd in the case that the valve timing is at the maximum retardation position and the crank angle signal period T, and stores the calculation result in its RAM.

Moreover, the maximum retardation value Td signifies an advance amount in the case that the intake side valve timing is at the maximum retardation position, and this value indicates an advance amount of the intake side cam angle with respect to the crank angle in the case that the valve overlap between the intake valve and the exhaust valve comes to a minimum.

$$Td=(\Delta Td/T)\times 180[degCA] \quad (1)$$

Furthermore, the ECU 100 obtains a real valve timing Ta on the basis of the phase difference time ΔTa, the crank angle signal period T and the maximum retardation value Td according to the following equation (2).

$$Ta=(\Delta Ta/T)\times 180[degCA]-Td \quad (2)$$

In this case, the detection of the maximum retardation value Td is for the purpose of correcting the variations among the products (the variations among the cam angle sensor installations and the output signals therefrom) to calculate the correct real valve timing Ta.

A current control circuit 114 is for controlling a linear solenoid current i for the OCV 80.

A CPU 102 calculates the linear solenoid current i for the OCV 80 on the basis of various input signals, and outputs, to an output port 108, a duty signal corresponding to the linear solenoid current i for the OCV 80 on the basis of a time measurement result by a timer 107.

FIG. 19 is a block diagram showing an internal configuration of an electronic control unit in a conventional valve timing control system for an internal combustion engine.

In FIG. 19, the ECU 100 includes a microcomputer 101.

The microcomputer 101 is composed of a CPU 102 for conducting various sorts of calculations and determinations, a ROM 103 for storing predetermined control programs and the like in advance, a RAM 104 for temporarily storing the calculation results of the CPU 102, and the like, an A/D converter 105 for converting an analog voltage into a digital value, a counter 106 for measuring a period of an input signal and the like, a timer 107 for measuring a drive time of an output signal and the like, an output port 108 acting as an output interface, and a common bus 109 for establishing connections among the blocks 102 to 108.

A first input circuit 110 waveform-shapes a crank angle signal SGT from the crank angle sensor 6 and a cam angle signal SGC from the cam angle sensor 24 and inputs them to the microcomputer 101 as an interruption instruction signal INT.

The CPU 102 reads the value of the counter 106 and stores it in the RAM 104 whenever an interruption takes place due to the interruption instruction signal INT.

In addition, the CPU 102 calculates a period T (see FIG. 18) of the crank angle signal SGT on the basis of a difference between the counter value when the last crank angle signal SGT was input and the present value, and further calculates an engine speed Ne on the basis of the crank angle signal period T.

Furthermore, the CPU 102 reads out, from the RAM 104, a counter value when a cam angle signal SGC is input thereto, and calculates a phase difference time ΔT on the basis of the read counter value and the counter value when a crank angle signal SGT is input thereto.

A second input circuit 111 reads in a coolant temperature W from the water temperature sensor 12, a throttle opening degree θ from the throttle sensor 27 and an intake air amount Q from the intake air amount sensor 28 and forwards them to the A/D converter 105 after conducting processing such as removal of noise components and amplification.

The A/D converter 105 converts the coolant temperature W, the throttle opening degree θ and the intake air amount Q into digital data and places the digital inputs in the CPU 102.

A drive circuit 112 outputs a control signal to drive the injector 30, while a drive circuit 113 outputs a control signal to operate the igniter 11.

The CPU 102 calculates, on the basis of the various sorts of input signals, a driving time of the injector 30 and an ignition timing of the igniter 11, and drives the injector 30 and the igniter 11 through the output port 108 and the drive circuits 112, 113 on the basis of the results of the time measurement by the timer 107, thereby controlling the fuel injection amount and the ignition timing.

A current control circuit 114 controls a linear solenoid current i for the OCV 80.

The CPU 102 calculates the linear solenoid current i for the OCV 80 on the basis of the various sorts of input signals, and further outputs, to the output port 108 a duty signal corresponding to the linear solenoid current i for the OCV 80.

The current control circuit 114 carries out control on the basis of the duty signal so that the linear solenoid current i flows in the linear solenoid 83, thus controlling the valve timing.

A power circuit 115 produces a constant voltage from a battery voltage input through the key switch 117, and the microcomputer 101 is operated by the constant voltage from the power circuit 115.

In general, a valve timing control system for an internal combustion engine is designed to conduct the valve timing control while learning a maximum retardation position of the valve timing.

In the conventional internal combustion engine valve timing control system, as operating modes there are set, for example, an idle operating mode, a low-speed operation mode, an acceleration/deceleration operation mode and the like. In these operation modes, the maximum retardation position of the valve timing is learned to control the valve timing based on the learned value of the maximum retardation position.

In the idle operation mode, the intake side or exhaust side valve timing is controlled that the valve overlap becomes a minimum. For instance, the intake side valve timing is set to a most retarded condition on the basis of the learned value of the maximum retardation position. Further, the valve timing control is implemented while this maximum retardation position is always learned.

In the low-speed operation mode or in the acceleration/deceleration operation mode, for example, in the case where the engine speed is between 1000 rpm and 5000 rpm, the intake side valve timing is advanced according to the operating situation.

For instance, in cases where the motor vehicle accelerates gradually from its stopping condition so that its speed gains, as shown in FIG. 9, the intake side valve timing is advanced gradually in accordance with the rise of the engine speed from when the engine speed exceeds 1000 rpm. Further, after the valve timing is most advanced at one engine speed, the valve timing is again retarded gradually to return to the maximum retardation position when the engine speed reaches approximately 5000 rpm.

As described above, in the conventional internal combustion engine valve timing control system, the maximum retardation position of the valve timing is learned at all times in each learning mode.

For this reason, for example, if foreign matters exist in the lubricating oil and the foreign matters get in the advancing chamber or the retarding chamber, there is a possibility that the maximum retardation position is learned in error in a state where the valve timing is not actually retarded up to the maximum retardation position. In such a case, the normal valve timing control becomes difficult, which can result in the deterioration of the operating performance and the exhaust gas purification.

SUMMARY OF THE INVENTION

Accordingly, the present invention has been developed with a view to resolving such problems, and it is an object of this invention to provide a valve timing control system for an internal combustion engine, which is capable of learning the maximum retardation position of the valve timing with precision to improve the operating performance and the exhaust gas purification.

For this purpose, in accordance with the present invention, there is provided a valve timing control system for an internal combustion engine, equipped with a variable valve timing mechanism for advancing and retarding a cam angle with respect to a crank angle through the use of lubricating oil pressure in the internal combustion engine, the control system comprising a crank angle detecting means for detecting the crank angle of the internal combustion engine, a cam angle detecting means for detecting the cam angle of the internal combustion engine, a phase difference calculating means for calculating an advance amount which is a phase difference between the crank angle and the cam angle, a learning means for learning the phase difference between the cam angle and the crank angle when a valve overlap between an intake valve and an exhaust valve is at a minimum, a learning instruction transmitting means for transmitting a learning instruction for learning the phase difference between the crank angle and the cam angle to the learning means, and a valve timing control variable calculating means for calculating a valve timing control variable, for driving the variable valve timing mechanism, on the basis of a deviation between the learned value of the phase difference between the crank angle and the cam angle, learned by the learning means, and the present phase difference between the crank angle and the cam angle, calculated by the phase difference calculating means, wherein the learning instruction transmitting means is used only before shipment of a motor vehicle equipped with the internal combustion engine or upon mechanical inspection thereof, and the learning means learns the phase difference between the crank angle and the cam angle only when receiving the learning instruction from the learning instruction transmitting means. Thus, it is possible to learn the maximum retardation value precisely in a state where foreign matter is not present in the lubricating oil of the internal combustion engine for driving the variable valve timing means, which achieves highly accurate valve timing control.

Furthermore, when the learning means receives the learning instruction from the learning instruction transmitting means, an operating condition control means controls the engine speed to within a predetermined range, and the learning means learns the phase difference between the crank angle and the cam angle only when confirming that the engine speed is within the predetermined range. Thus, precise learning of the maximum retardation value becomes possible with the operating condition being stable, thereby achieving highly accurate valve timing control.

In this case, the predetermined range of the engine speed is preferably from 1000 rpm to below 2000 rpm. Accordingly, precise learning of the maximum retardation value becomes possible in an operating condition where combustion is stable, thereby enabling highly accurate valve timing control.

Furthermore, the predetermined range of the engine speed is more preferably from 1500 rpm to below 2000 rpm. Accordingly, precise learning of the maximum retardation value becomes possible in an operating condition where not only the combustion is stable but also the oil pressure is stable, thus accomplishing highly accurate valve timing control.

Still further, the predetermined range of the engine speed is a range of 1300 rpm±100 rpm. Accordingly, precise learning of the maximum retardation value becomes achievable with an operating condition being stable, thus accomplishing higher-precision valve timing control.

Moreover, if a determination is made that the engine speed does not lie within the predetermined range, a correction is made on the basis of the difference between the present engine speed and a desired engine speed (target engine speed) so that the engine speed is controlled to within the predetermined range through feedback control using this correction value. Accordingly, precise learning of the maximum retardation value becomes achievable with the operating condition being stable, thus accomplishing highly accurate valve timing control.

Moreover, the control of the engine speed is implemented by adjusting an opening degree of a valve installed in a passage for intaking the outside air into a cylinder in a state of bypassing a throttle valve. Accordingly, precise learning of the maximum retardation value becomes achievable in a state where the engine speed is controlled so that the operating condition is stable, thus achieving highly accurate valve timing control.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

First Embodiment

Figure 1:
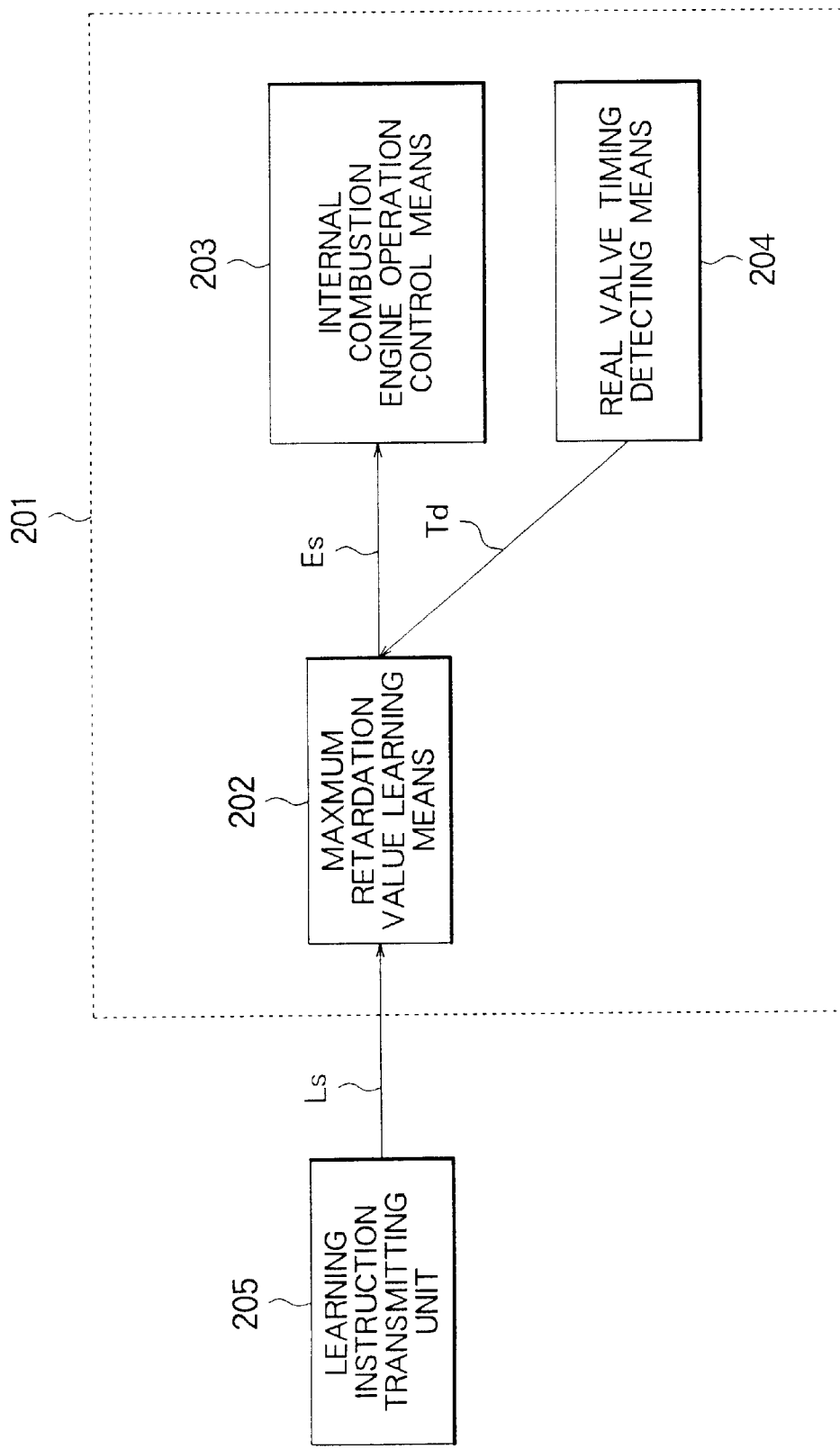
FIG. 1 is a block diagram functionally showing a configuration of a valve timing control system for an internal combustion engine according to a first embodiment of this invention.

FIG. 1 is a block diagram functionally showing a configuration of a valve timing control system for an internal combustion engine according to a first embodiment of this invention.

As FIG. 1 shows, the valve timing control system for an internal combustion engine according to the first embodiment of this invention is provided with an ECU 201. The ECU 201 comprises functionally a maximum retardation value learning means 202, an internal combustion engine operation control means 203 and a real valve timing detecting means 204.

The maximum retardation value learning means 202 functions as a learning means, the internal combustion engine operation control means 203 serves as a crank angle detecting means, a cam angle detecting means and a valve timing control variable calculating means, and the real valve timing detecting means 204 acts as a phase difference calculating means. In addition, a learning instruction transmitting unit 205 functions as a learning instruction transmitting means.

Furthermore, the learning instruction transmitting unit 205 is an external device that may be connected to the ECU 201, and is a signal transmitting means having a function to transmit a learning instruction signal to the maximum retardation value learning means 202 so that the maximum retardation value learning means 202 learns the maximum retardation position of the valve timing.

Thus, the internal combustion engine valve timing control system according to this invention is made to learn the maximum retardation value only when receiving the learning instruction signal from the learning instruction transmitting unit 205. Accordingly, the ECU 201 does not perform the conventional idle learning mode, low-speed learning mode and acceleration/deceleration learning mode. For this reason, basically the ECU 201 is not required to have functions for conducting the conventional idle learning mode, low-speed learning mode and acceleration/deceleration learning mode. Naturally, it is also appropriate that these functions are provided in the ECU 201 to be used in case of emergency.

In general, this learning instruction transmitting unit 205 is equipment that is to be used while being connected to the ECU 201 after completion of assembly of the internal combustion engine but before shipment of the motor vehicle as a product.

Moreover, the first embodiment will be described in the case where this invention is applied to an internal combustion engine in which the valve timing control system is provided on the intake side.

The maximum retardation value learning means 202 calculates the phase difference (advance amount) between the cam angle on the intake valve side and the crank angle when the valve timing is at the maximum retardation position, and stores and retains this advance amount as a learned value. An advance amount to be taken for when the intake side valve timing is at the maximum retardation position will be referred to hereinafter as a maximum retardation value. This value means a phase difference (advance amount) between an intake side cam angle and a crank angle in the case that the valve overlap between the intake valve and the exhaust valve is at a minimum.

Furthermore, the crank angle and the cam angle are sensed by a crank angle sensor 6 and a cam angle sensor 24, respectively.

The internal combustion engine operation control means 203 controls fuel injection amount, ignition timing, valve timing and the like in the internal combustion engine 1.

The real valve timing detecting means 204 detects the deviation between the advance amount in the present operating condition and the above-mentioned maximum retardation value. This deviation denotes an amount (which will be referred to hereinafter as a VVT control variable) of the intake side valve timing to be advanced virtually by the VVT mechanism.

The learning instruction transmitting unit 205 has a push-button switch (not shown) to be used to transmit a signal Ls. Upon the depression of this push-button switch, the signal Ls instructing the implementation of a maximum retardation value learning mode, in which learns the maximum retardation position is learned, is transmitted from the learning instruction transmitting unit 205 to the maximum retardation value learning means 202.

Upon a receipt of the signal Ls, the maximum retardation value learning means 202 forwards an instruction signal Es to the internal combustion engine operation control means 203, and learns, as the maximum retardation value, the phase difference between the intake side cam angle and the crank angle when the valve overlap between the intake valve and the exhaust valve detected by the internal combustion engine operation control means 203 is at a minimum.

Furthermore, the internal combustion engine operation control means 203 controls the operation of the internal combustion engine 1 on the basis of the maximum retardation value that the maximum retardation value learning means 202 learns.

Figure 2:
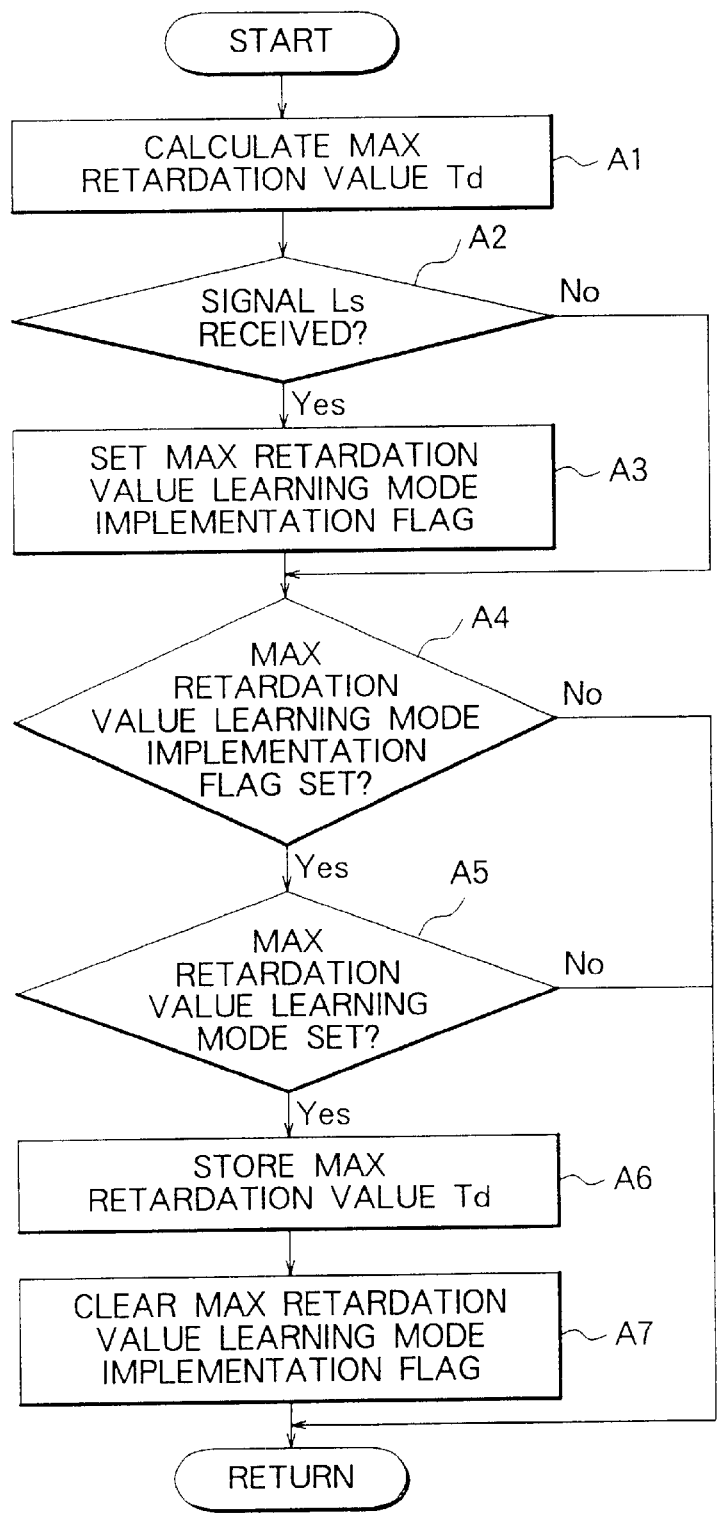
FIG. 2 is a flow chart showing the process in a maximum retardation value learning mode in the first embodiment of this invention.

FIG. 2 is a flow chart showing the process of the maximum retardation value learning mode in the first embodiment of this invention.

First, a step A1 is implemented to calculate the maximum retardation value Td according to the equation (1). Next, in step A2 it is determined whether or not a signal Ls for implementing the maximum retardation value learning mode has been received, from the learning instruction transmitting unit 205.

If the determination of step A2 in that the signal Ls has not been received from the learning instruction transmitting unit 205, the process flow proceeds to step A4.

On the other hand, if the determination of the step A2 indicates signal Ls from the learning instruction transmitting unit 205 has been received, the flow proceeds to a step A3.

In step A3, a maximum retardation value learning mode implementation flag is set and the flow proceeds to the step A4.

In step A4, it is determined whether or not the maximum retardation value learning mode implementation flag is set.

If the step A4 shows that the maximum retardation value learning mode implementation flag is not set, the flow returns so that the process starts again from step A1.

On the other hand, if step A4 indicates that the maximum retardation value learning mode implementation flag has been set, the flow proceeds to step A5.

In step A5, whether or not the maximum retardation value learning mode is set is determined. If the maximum retardation value learning mode is not set, the flow returns so that the process starts again from the step A1.

On the other hand, if it is determined in step A5 that the maximum retardation value learning mode has been set, the flow advances to a step A6.

In step A6, the maximum retardation value Td is stored.

After the storing the maximum retardation value Td in step A6, the flow proceeds to a step A7 to clear the maximum retardation value learning mode implementation flag.

After completion of the step A7, the flow returns to the step A1 to repeat the process.

In the maximum retardation value learning mode, the intake side valve timing is controlled to the maximum retardation position irrespective of the engine speed. That is, in the maximum retardation value learning mode, the intake side valve timing is not advanced.

Furthermore, in the maximum retardation value learning mode, the maximum retardation value learning means 202 calculates the maximum retardation value Td according to the equation (1).

When the maximum retardation value is learned in this maximum retardation value learning mode, since there is no foreign matter in the lubricating oil, the intake side valve timing is at the maximum retardation position and precise learning of the maximum retardation value becomes possible.

Still further, the maximum retardation value learned by the maximum retardation value learning means 202 is stored and retained in a ROM of the ECU 201.

This ROM can be be a type that, for example, it backs up the learned maximum retardation value Td from a battery even if the ignition is in an OFF state, or can also be an EEPROM not requiring such backup.

As described above, with the internal combustion engine valve timing control system according to the first embodiment of this invention, since the maximum retardation value is learned only when the ECU 201 receives the signal Ls from the learning instruction transmitting unit 205, there is no possibility that the maximum retardation value will be learned in error because of foreign matters in the lubricating oil. Consequently, the maximum retardation value can be precisely learned when the intake side valve timing is at the maximum retardation position.

Moreover, the learning of the maximum retardation value using the learning instruction transmitting unit in this way is not limited to before the vehicle is shipped, but it can also be performed periodically after shipment. In this case, it is possible to cope with changes over time after shipment, thus the operating condition of the internal combustion engine can be maintained in good condition over a long period of time.

Second Embodiment

Figure 3:
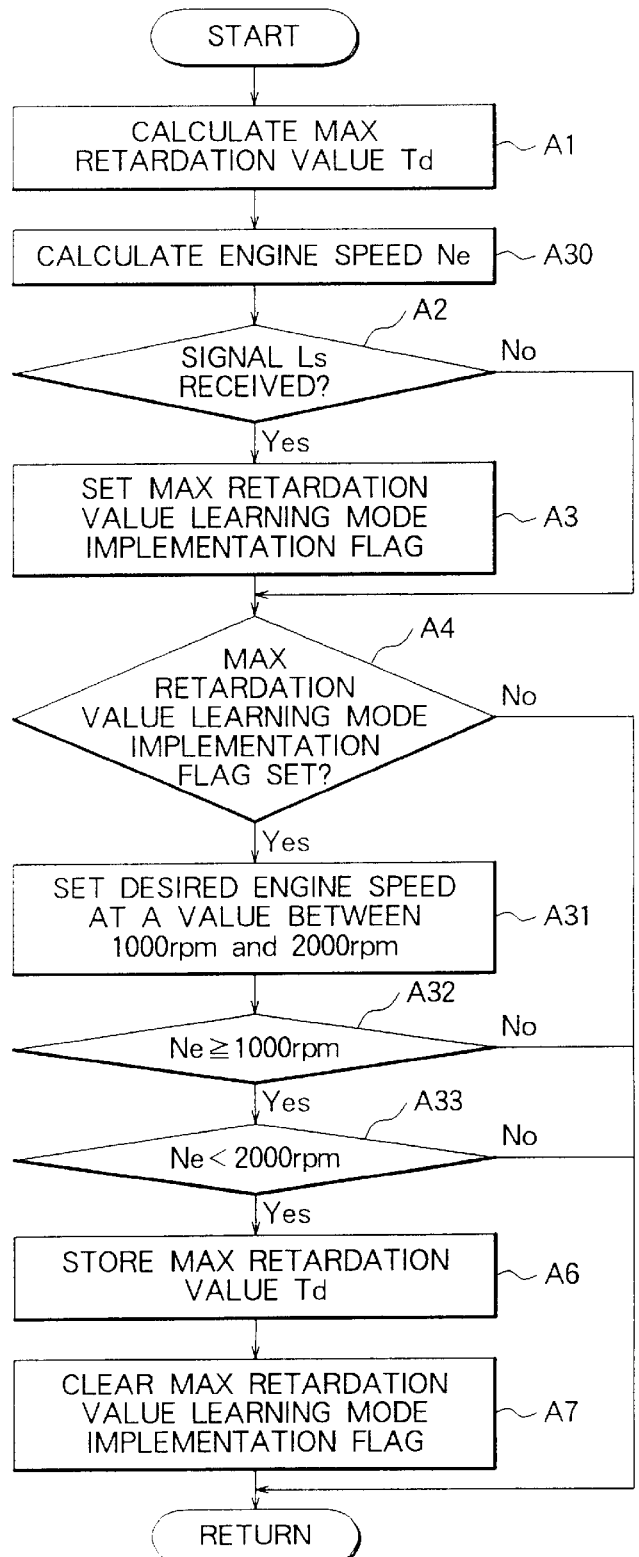
FIG. 3 is a flow chart showing the process in a valve timing control system for an internal combustion engine according to a second embodiment of this invention.

FIG. 3 is a flow chart showing the process in a valve timing control system for an internal combustion engine according to a second embodiment of this invention.

The configuration of the internal combustion engine valve timing control system according to the second embodiment is similar to that of the first embodiment, except for the processing which will be described hereinbelow.

In FIG. 3, steps A1 to A7 are identical to those in FIG. 2, and the repeated description thereof will be omitted.

Upon completion of step A1, the process flow proceeds to step A30 to calculate engine speed Ne. After the calculation of the engine speed Ne in step A30, the flow advances through steps A2 and A3 to step A4. Moreover, if step A2 is "No", the flow proceeds directly to step A4 without passing through step A3.

After the learning flag is set in step A4, the flow proceeds to step A31 to set desired engine speed at a value between 1000 rpm and 2000 rpm. Upon setting of the desired engine speed, the ECU 201 controls the engine speed.

The flow advances to step A32 to determine whether or not the engine speed Ne is 1000 rpm or more.

If step A32 indicates that the engine speed is above 1000 rpm, the flow proceeds to a step A33 to determine whether or not the engine speed is below 2000 rpm.

If the determination of the step A33 indicates that the engine speed is below 2000 rpm, the flow goes to the steps A6 and A7.

Moreover, if step A32 shows that the engine speed is below 1000 rpm, or if step A33 indicates that the engine speed exceeds 2000 rpm, the flow returns so that the entire process starts from the step A1.

Figure 10:
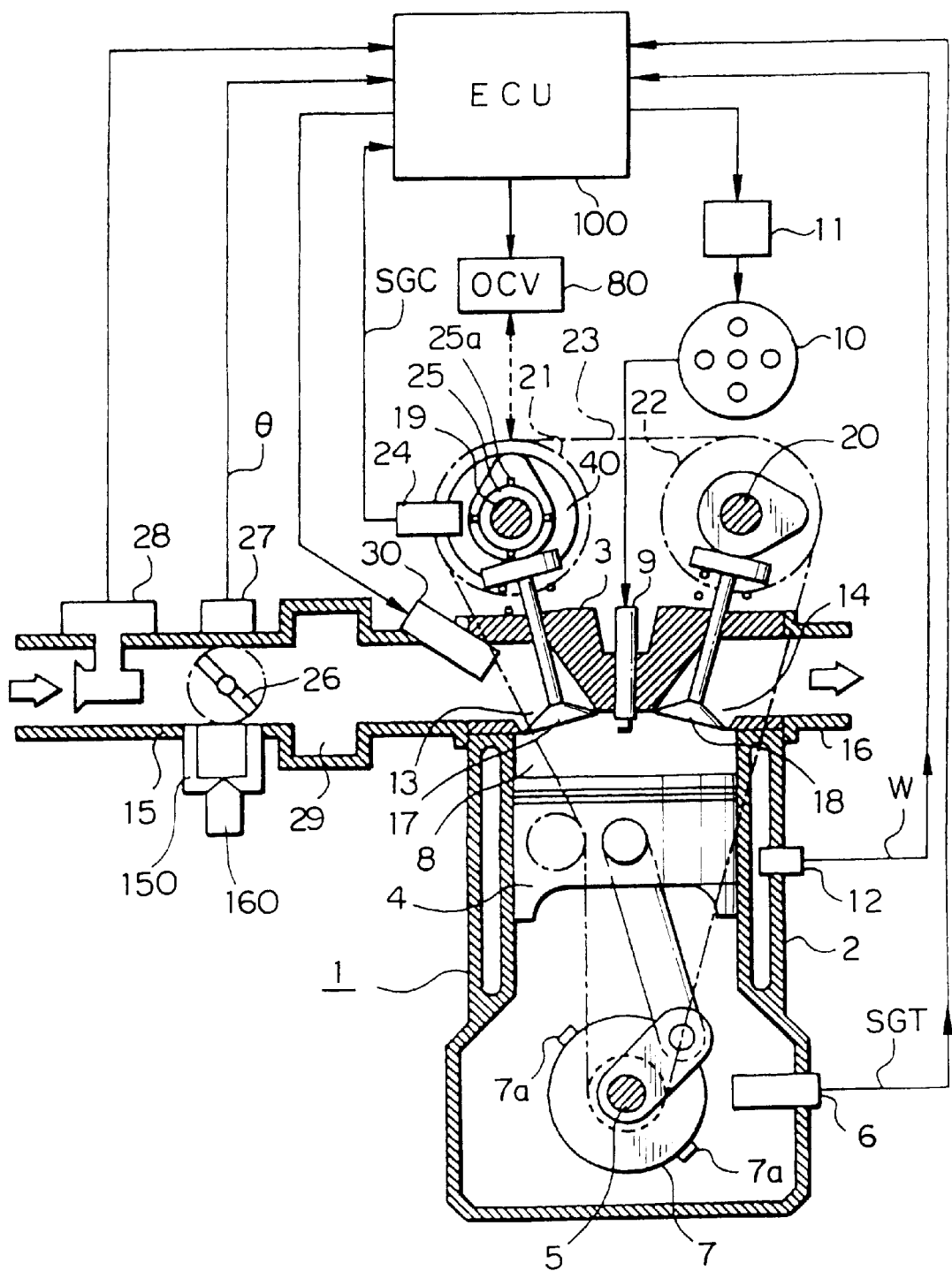
FIG. 10 is an illustration of a general mechanism for controlling the engine speed.
Figure 11:
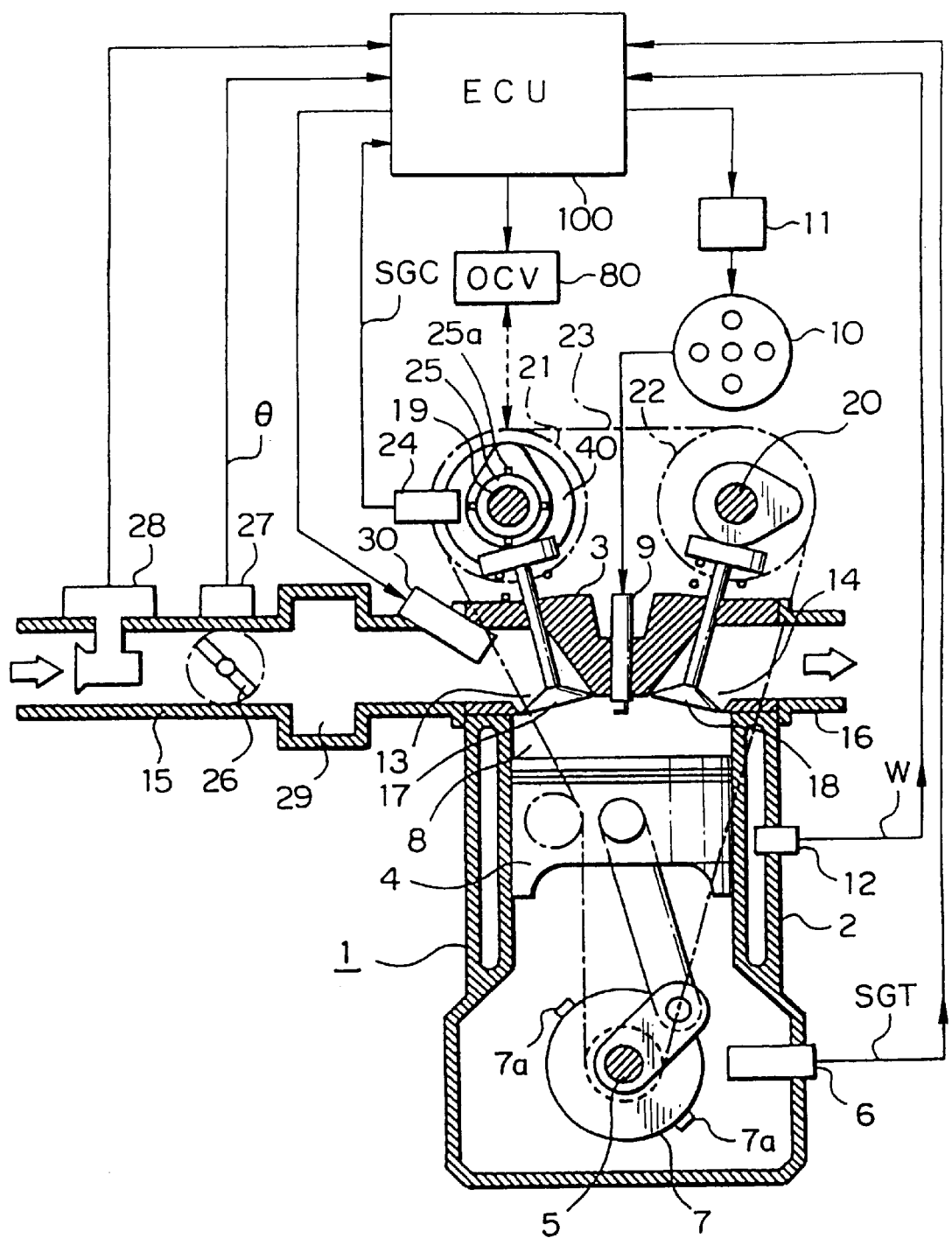
FIG. 11 schematically shows a configuration of an internal combustion gasoline engine system including a conventional variable valve timing actuator.
Figure 12:
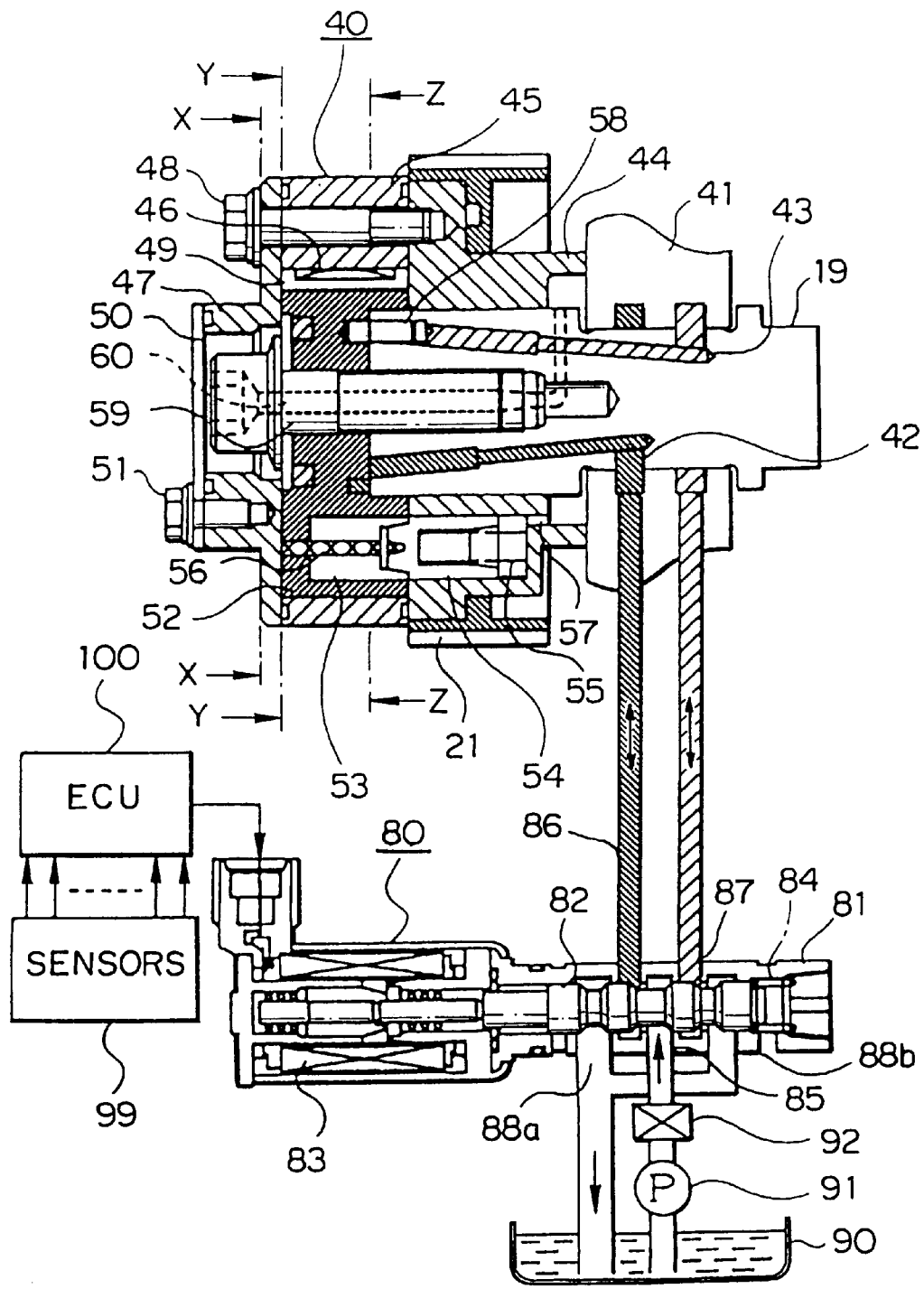
FIG. 12 is a cross-sectional view showing structures of a conventional variable valve timing actuator and a general oil control valve.
Figure 13:
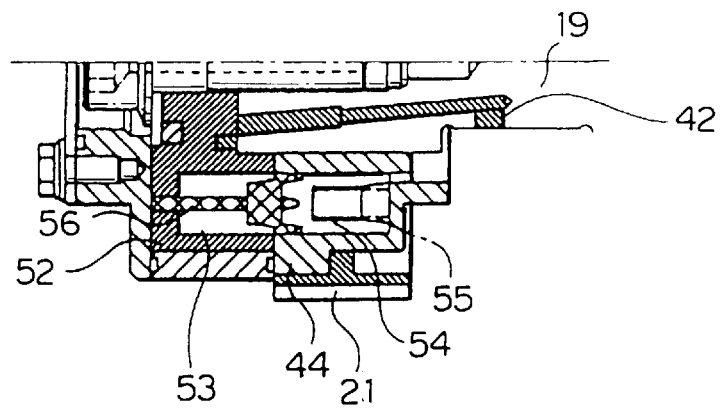
FIG. 13 is a cross-sectional view for describing the operation of the variable valve timing actuator in FIG. 12.
Figure 14:
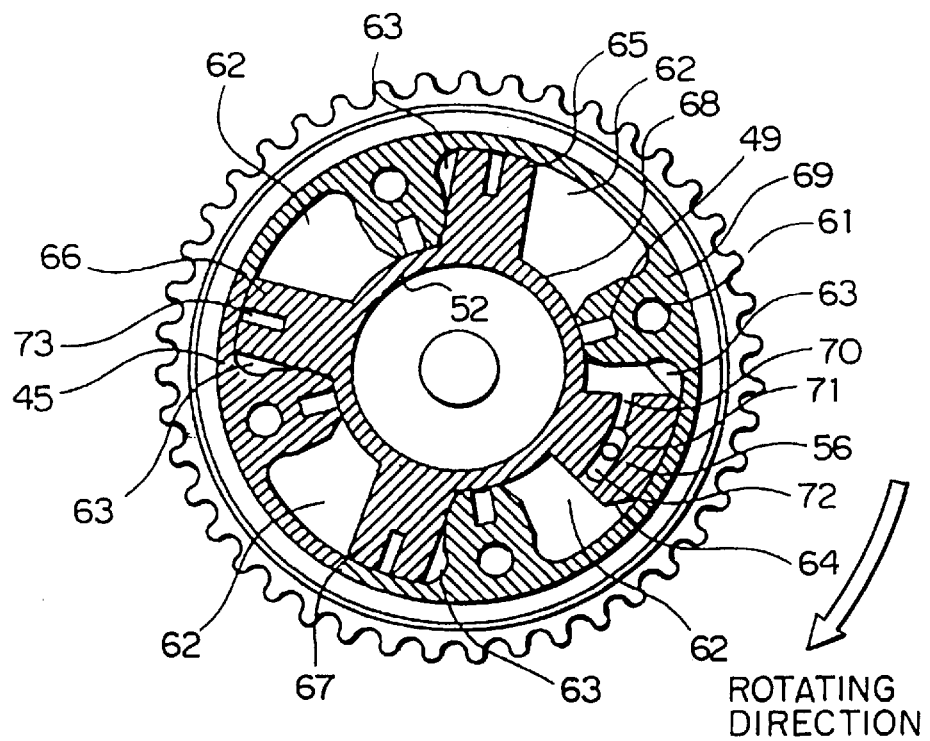
FIG. 14 is a cross-sectional view taken along the line X—X of FIG. 12.
Figure 15:
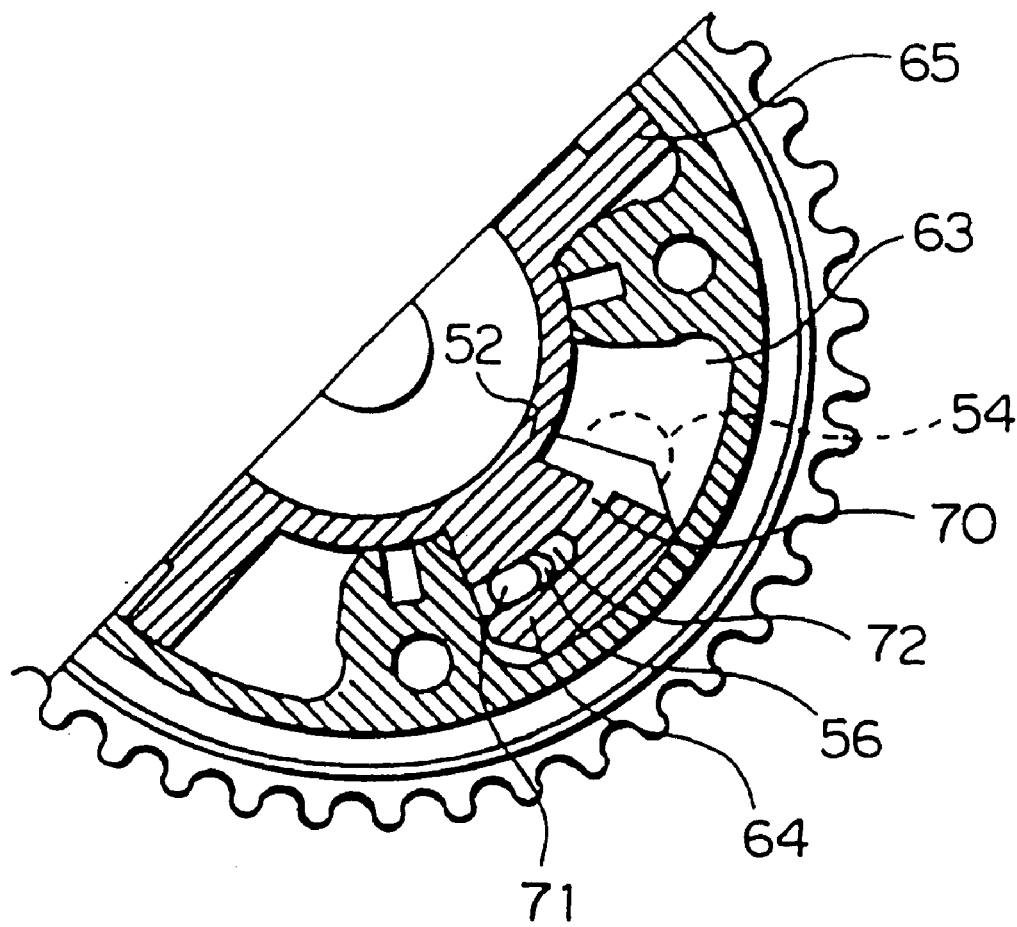
FIG. 15 is a cross-sectional view showing a state in which the slide plate in FIG. 14.
Figure 16:
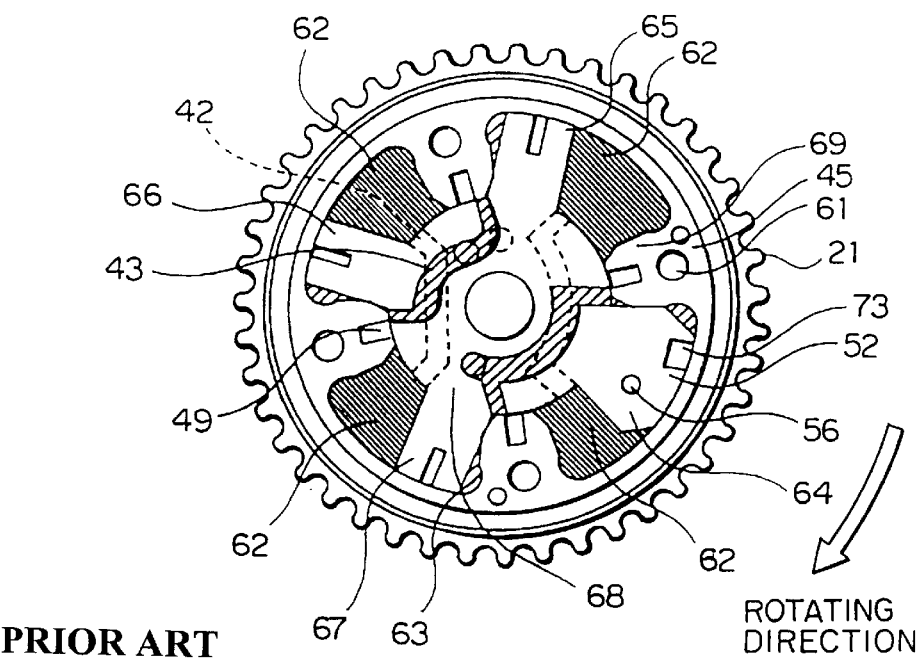
FIG. 16 is a cross-sectional view taken along the line Y—Y of FIG. 12.
Figure 17:
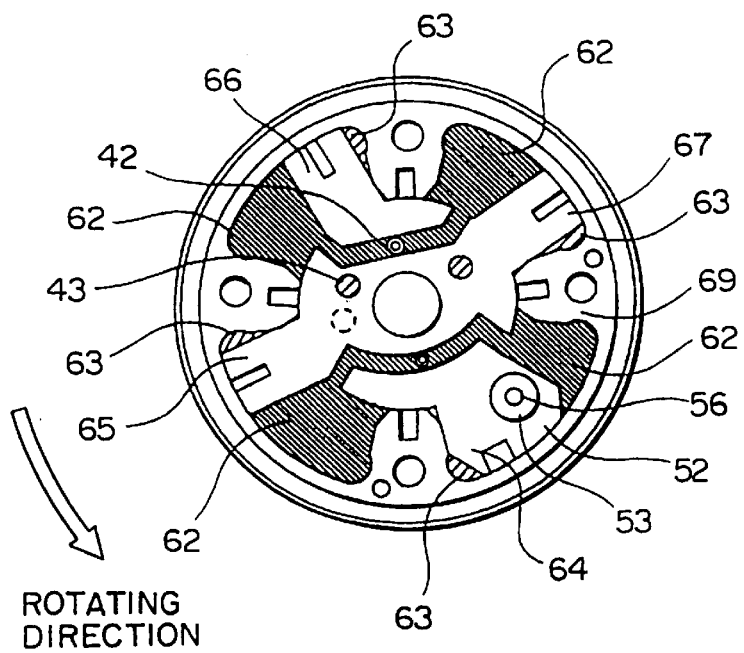
FIG. 17 is a cross-sectional view taken along the line Z—Z of FIG. 12.
Figure 18:
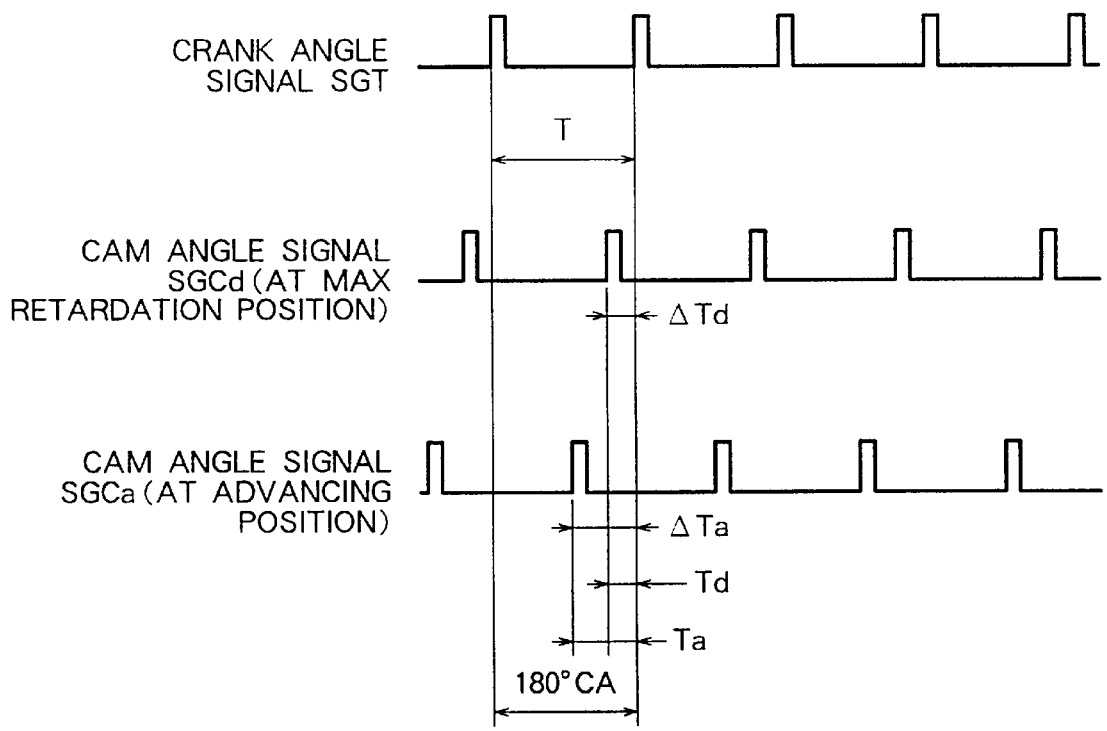
FIG. 18 is a timing chart showing states of variations of a crank angle signal, a cam angle signal and a real valve timing in a general configuration.
Figure 19:
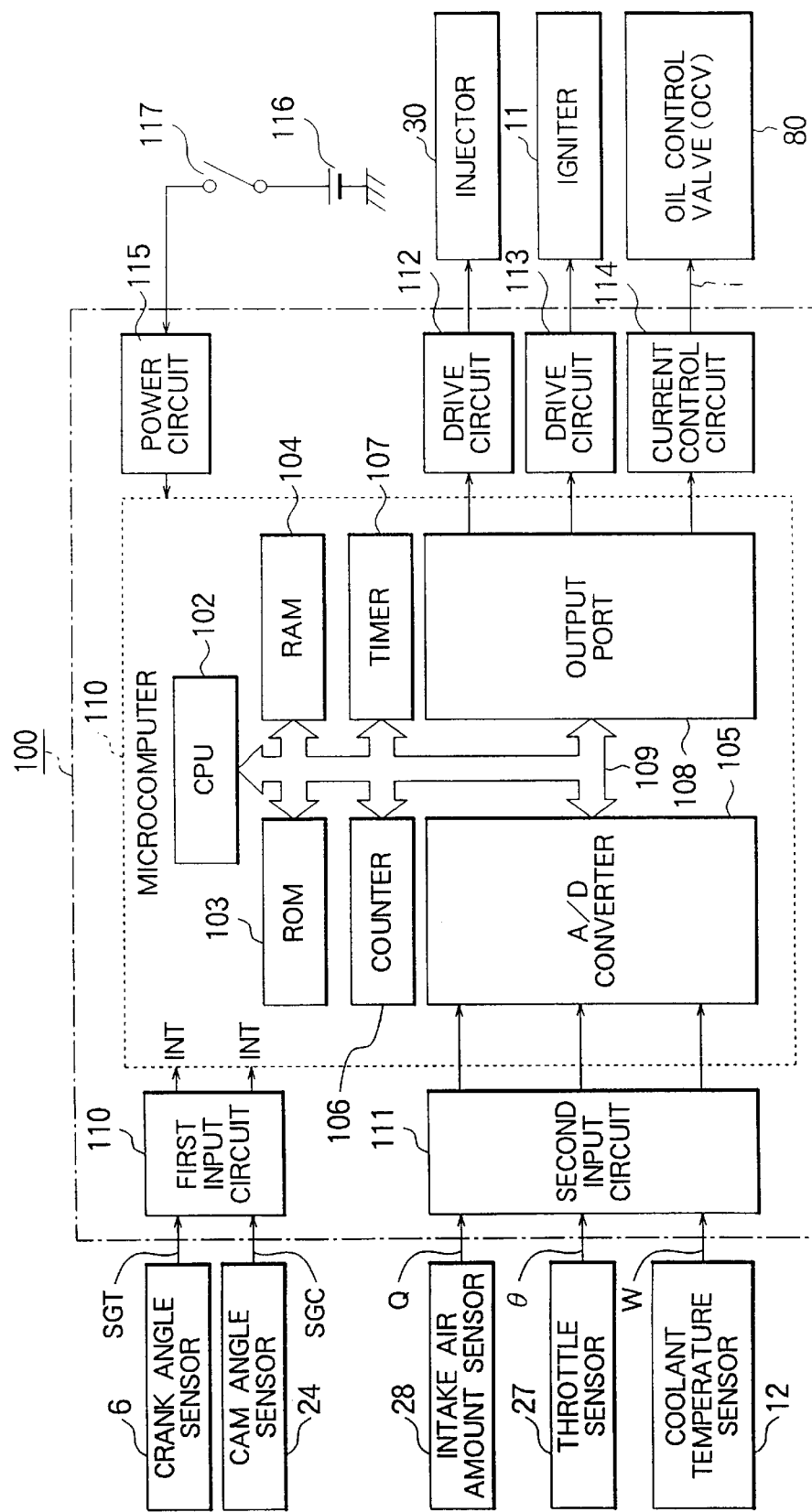
FIG. 19 is a block diagram showing an internal configuration of an electronic control unit in a conventional valve timing control system for an internal combustion engine.

FIG. 10 is a cross-sectional view schematically showing an internal combustion engine equipped with the internal combustion engine valve timing control system according to the second embodiment of this invention. The configuration shown in FIG. 10 is the same as that of the conventional internal combustion engine shown in FIG. 11, except for an intake passage 150 and a solenoid valve 160.

The intake passage 150 is to introduce the outside air into the cylinder while bypassing a throttle valve 26, wheas the solenoid valve 160 is a valve for adjusting the amount of intake air to be introduced through the intake passage 150. The solenoid valve 160 is controlled by a duty signal.

The intake passage 150 and the solenoid valve 160 are mechanisms which are commonly used in operation control units of internal combustion engines, and are mainly used when controlling engine operation by adjusting the engine speed when the throttle valve 26 is in the fully closed condition, that is, when the engine is idling.

In the above-mentioned step A31, the engine speed can be controlled to the desired engine speed by controlling the solenoid valve 160 noted above.

Although the second embodiment of this invention employs the intake passage 150 and the solenoid valve 160, other mechanisms may also be used for the operational control as long as they can adjust the intake air amount. For example, in the case of an internal combustion engine using an electronic throttle valve, the engine speed may be controlled to be between 1000 rpm to 2000 rpm by controlling the opening/closing of the electronic throttle valve during the idling operation.

As described above, with the internal combustion engine valve timing control system according to the second embodiment of this invention, since the maximum retardation value is only learned when the ECU 201 receives the signal Ls from the learning instruction transmitting unit 205, there is no possibility that the maximum retardation value will be learned in error due to foreign matters in the lubricating oil. Additionally, when learning the maximum retardation value, the engine speed is controlled to between 1000 rpm to 2000 rpm; therefore, the lubricating oil pressure can be increased to be higher than in the idling operation, which makes it possible to learn the maximum retardation value accurately when the intake side valve timing is at the maximum retardation position.

Third Embodiment

Figure 4:
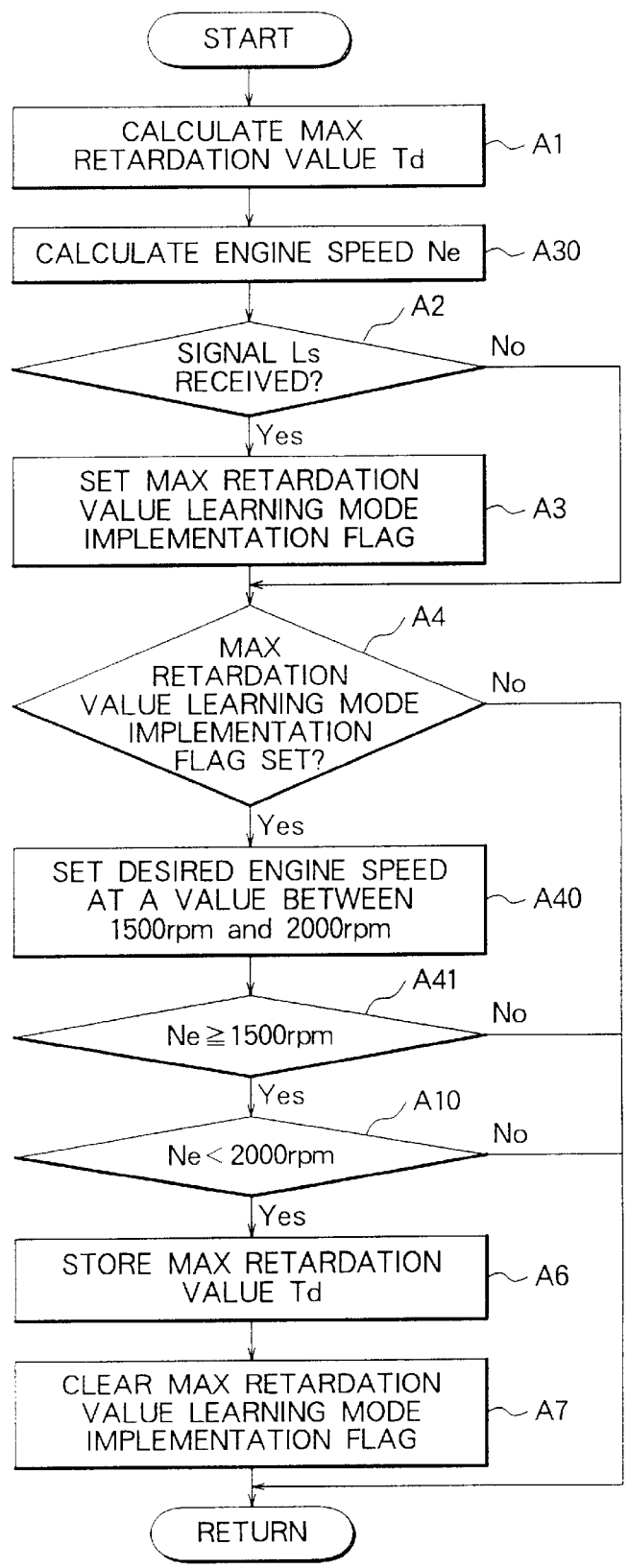
FIG. 4 is a flow chart showing the process in a valve timing control system for an internal combustion engine according to a third embodiment of this invention.

FIG. 4 is a flow chart showing the process in a valve timing control system for an internal combustion engine according to a third embodiment of this invention.

The configuration of the internal combustion engine valve timing control system according to the third embodiment of this invention is similar to the configurations of the first and second embodiments. Accordingly, the steps marked with the same numerals signify the same process, and the repeated description thereof will be omitted.

The flow chart shown in FIG. 4 is identical to the flow chart of FIG. 3 except that the steps A31 and A32 in FIG. 3 are changed to steps A40 and A41, respectively.

If the determination of the step A4 indicates that the learning flag is set, the flow goes to the step A40 to set a desired engine speed at a value from 1500 rpm to below 2000 rpm. Upon setting the desired engine speed, similar to the step A31 in the second embodiment, the ECU 201 controls the solenoid valve 160 or the electronic throttle valve controls the engine speed.

Following the step A40, the flow reaches the step A41 to check whether or not the engine speed Ne is 1500 rpm or more. If step A41 indicates that the engine speed exceeds 1500 rpm, the flow proceeds to the step A33 to check whether or not the engine speed is below 2000 rpm.

If step A33 indicates that the engine speed is below 2000 rpm, the flow goes to the steps A6 and A7.

Moreover, if step A41 shows that the engine speed is below 1500 rpm, or if step A33 indicates that the engine speed is 2000 rpm or more, the flow returns to restart the entire process from the step A1.

As described above, with the internal combustion engine valve timing control system according to the third embodiment of this invention, since the maximum retardation value is learned only when the ECU 201 receives the signal Ls from the learning instruction transmitting unit 205, there is no possibility that the maximum retardation value will be learned in error because of foreign matters in the lubricating oil. Additionally, for learning the maximum retardation value, the engine speed is controlled to a value from 1500 rpm to 2000 rpm; therefore, the lubricating oil pressure can be increased to be sufficiently higher than in the idling operation, which makes it possible to learn the maximum retardation value more accurately at a position (the maximum retardation position) where the rotor 52 is stopped mechanically on the retardation side with respect to the housing 44.

Fourth Embodiment

Figure 5:
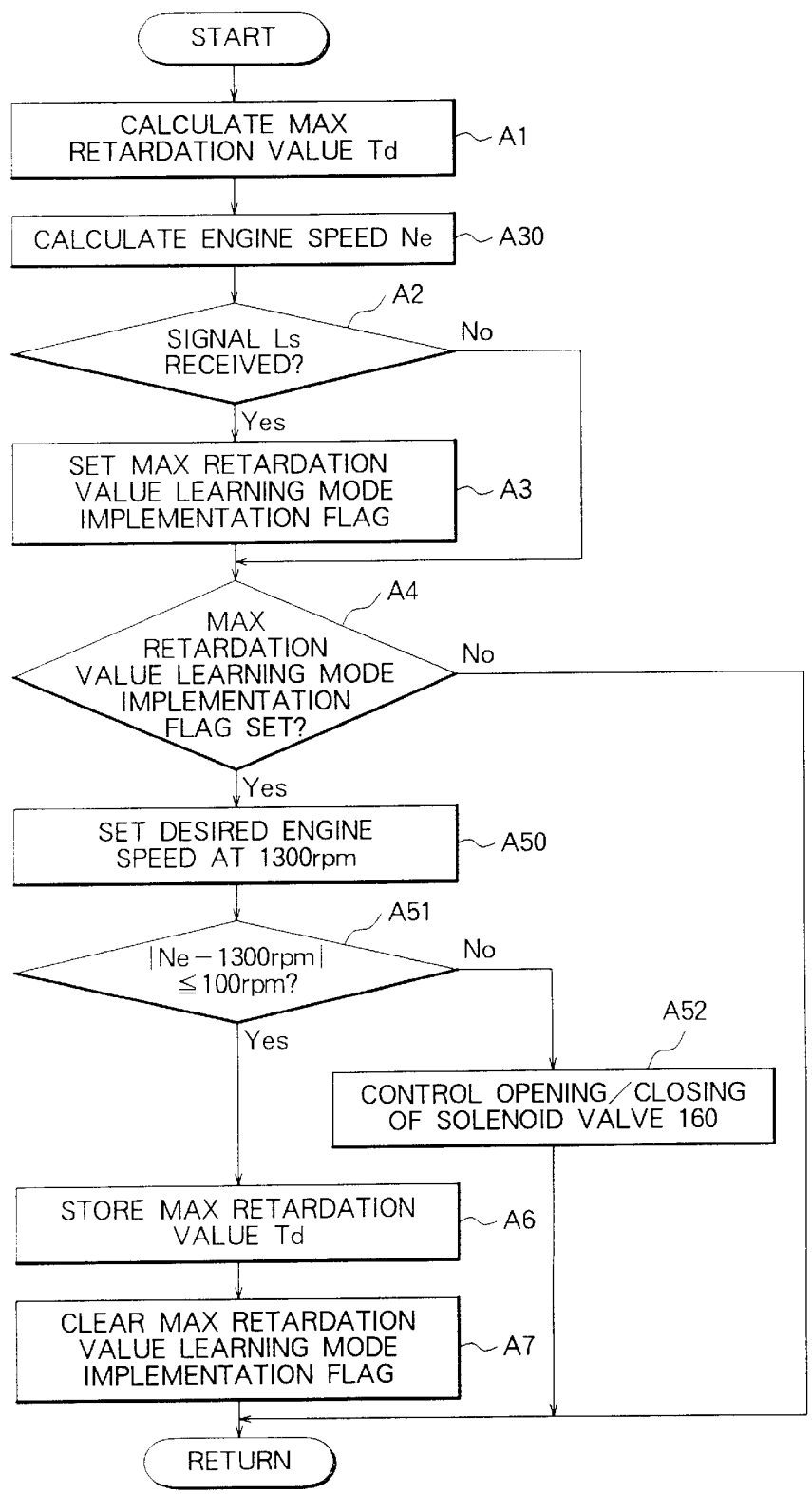
FIG. 5 is a flow chart showing the process in a valve timing control system for an internal combustion engine according to a fourth embodiment of this invention.

FIG. 5 is a flow chart showing the process of a valve timing control system for an internal combustion engine according to a fourth embodiment of this invention.

Figures 7, 8:
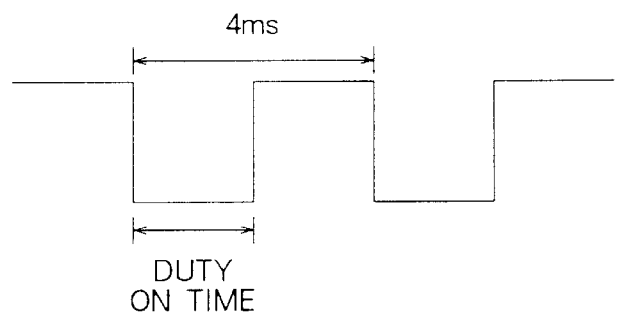
FIG. 7 is a table showing the relationship between desired engine speed and a base duty ON time.
FIG. 8 is a table showing the increase and decrease in the duty ON time with respect to the difference between desired engine speed and present engine speed.
Figure 9:
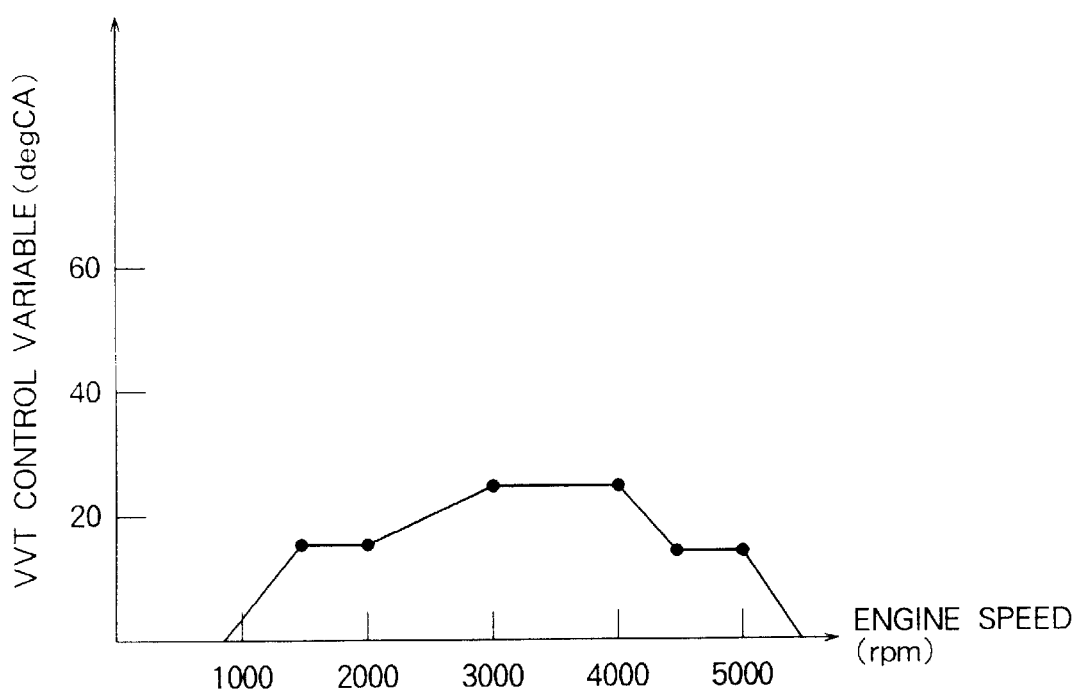
FIG. 9 is an illustration of an advance characteristic in general valve timing control.

FIG. 7 is a table showing the relationship between a desired engine speed and a base duty ON time.

FIG. 8 is a table showing the increase and decrease in the duty ON time with respect to the difference between a desired engine speed and the present engine speed.

A configuration of the internal combustion engine valve timing control system according to the fourth embodiment of this invention is similar to those in the first to third embodiments. Accordingly, the steps marked with the same numerals signify the same contents, and the repeated description thereof will be omitted.

In the flow chart of FIG. 5, if step A4 indicates that the learning flag is set, the flow proceeds to a step A50.

The step A50 is for setting a desired value (target value) of the engine speed at 1300 rpm and for adjusting the engine speed to 1300 rpm. For instance, when the desired engine speed to be set in the step A50 is 1300 rpm, referring to the table of FIG. 7, the base duty ON time is set at 2.6 ms. Thereafter, the flow proceeds to step A51.

In the step A51, whether or not the present engine speed is within a range of 1300±100 rpm is determined.

If the determination of the step A51 indicates that the present engine speed is within a range of 1300±100 rpm, the flow proceeds to the steps A6 and A7.

On the other hand, if the determination of the step A51 indicates that the present engine speed is out of a range of 1300±100 rpm, the flow advances to a step A52 to control the solenoid valve 160 so that the engine speed enters the aforesaid range.

The duty ON time in FIG. 7 cannot necessarily cope with the differences between mass produced internal combustion engines, and since the coil resistance value of the solenoid valve 160 is increased by the continuous supply of current, it is difficult to operate the internal combustion engine with the duty ON time set in the table of FIG. 7. Accordingly, even if the control of the engine speed is intended for 1300 rpm, by fixing the base duty ON time at 2.6 ms, there is a possibility that an error will occur with respect to actual engine speed. For this reason, in the step A52, the duty ON time is corrected according to the table of FIG. 8.

When the duty ON time is corrected on the basis of the table of FIG. 8, as the deviation ΔNe between the desired engine speed and the atual engine speed increases, the correction value is increased.

The duty ON time is expressed by the following equation:

$$\text{Duty ON Time} = \text{Base Duty ON Time} + \text{Duty Increase/Decrease Time} \quad (3)$$

After the duty ON time is corrected in the step A52, the flow returns to the step A1 to repeat the processing.

Although in the fourth embodiment of this invention the desired speed is fixed to 1300 rpm and the convergence determination speed is fixed at ±100 rpm, this invention is not limited thereto.

As described above, with the internal combustion engine valve timing control system according to the fourth embodiment of this invention, since the maximum retardation value is learned only when the ECU 201 receives the signal Ls from the learning instruction transmitting unit 205, there is no possibility that the maximum retardation value will be learned in error due to foreign matter in the lubricating oil. Additionally, for learning the maximum retardation value, the engine speed is controlled to be 1300 rpm ±100 rpm; therefore, the lubricating oil pressure can be increased to be sufficiently higher than in the idling operation, which makes it possible to learn the maximum retardation value more accurately at a position (the maximum retardation position) where the rotor 52 is stopped mechanically on the retardation side with respect to the housing 44.

In addition, since the engine speed can be set within a specific range when learning the maximum retardation value, the learning of the maximum retardation value is facilitated.

Fifth Embodiment

Figure 6:
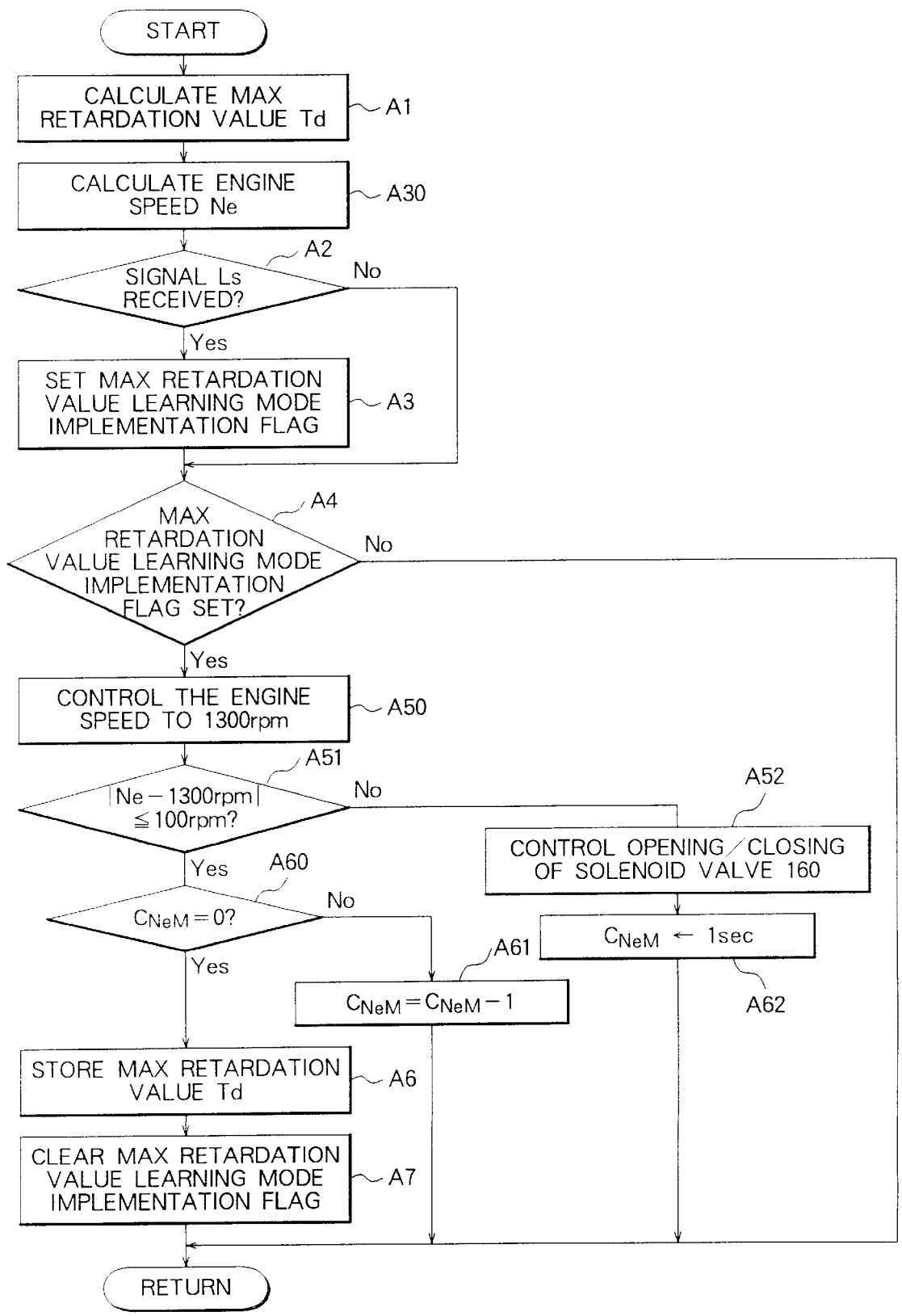
FIG. 6 is a flow chart showing the process in a valve timing control system for an internal combustion engine according to a fifth embodiment of this invention.

FIG. 6 is a flow chart showing the process in a valve timing control system for an internal combustion engine according to a fifth embodiment of this invention.

The internal combustion engine valve timing control system according to the fifth embodiment of this invention is similar to the first to fourth embodiments. Accordingly, the steps marked with the same numerals signify the same contents, and the repeated description thereof will be omitted.

In FIG. 6, if in the step A51 it is determined that the engine speed is within a range of 1300 rpm±100 rpm, the flow proceeds to a step A60 to check whether or not the count $C_{NeM}$ of an engine speed stabilization timer is 0 sec.

If in step A60 the determination is made that the count $C_{NeM}$ is 0 sec, the flow goes to the step A6 to calculate the maximum retardation value Td.

On the other hand, if the determination of the step S60 is that the count $C_{NeM}$ is not 0 sec, the flow proceeds to a step A61 to decrement the count $C_{NeM}$.

Furthermore, if the determination of the step A51 is that the engine speed is out of the range of 1300 rpm±100 rpm, the flow proceeds to the step A52 to control the solenoid valve 160 so that the engine speed enters a range of 1300 rpm±100 rpm.

Moreover, the flow goes to a step A62 to set the count $C_{NeM}$ of the engine speed stabilization timer at the initial value of 1 sec.

Moreover, although in this case the initial value is set to 1 sec, this invention is not limited thereto. Such an initial value is for the purpose of making a determination as to whether or not the operating condition of the internal combustion engine is stable, and the initial value is not limited to 1 sec as long as it is a period of time sufficient to make a determination that the operating condition of the internal combustion engine is stable.

As described above, with the internal combustion engine valve timing control system according to the fifth embodiment of this invention, since the maximum retardation value is learned after it is confirmed that the engine speed enters a desired range (target range) for a predetermined time or more, it is possible to learn the maximum retardation value more precisely in a state where the operating condition is stable.

Although in the above description the learning instruction transmitting unit 205 is an external unit separate from the ECU 201, this invention is similarly applicable even if the learning instruction transmitting unit 205 is built into the ECU 201. Further, in the case where the ECU 201 has the function of the aforesaid learning instruction transmitting unit 205, the signal Ls is transmitted to the maximum retardation value learning means 202 through the internal data communication in the ECU 201.

In addition, although in the above description the control for the valve timing is implemented on the intake valve side, in the control of the valve timing on the exhaust valve side, a valve timing retardation control is carried out with the maximum advance position being as a reference, and the contents of such a control are substantially similar to those of the intake valve side advance control.

It should be understood that the foregoing relates to only preferred embodiments of the present invention, and that it is intended to cover all changes and modifications of the embodiments of the invention herein used for the purpose of disclosure, which do not constitute departures from the spirit and scope of the invention.

What is claimed is:

1. A valve timing control system for an internal combustion engine, equipped with a variable valve timing mechanism for advancing and retarding a cam angle with respect to a crank angle through the use of lubricating oil pressure in said internal combustion engine, said control system comprising:

crank angle detecting means for detecting the crank angle of said internal combustion engine;

cam angle detecting means for detecting the cam angle of said internal combustion engine;

phase difference calculating means for calculating an advance amount which is a phase difference between said crank angle and said cam angle;

learning means for learning the phase difference between said cam angle and said crank angle when a valve overlap between operations of an intake valve and an exhaust valve is at a minimum;

learning instruction transmitting means for transmitting to said learning means a learning instruction for learning said phase difference between said crank angle and said cam angle; and valve timing control variable calculating means for calculating a valve timing control variable, for driving said variable valve timing mechanism, on the basis of a deviation between the learned value of said phase difference between said crank angle and said cam angle, learned by said learning means, and the present phase difference between said crank angle and said cam angle, calculated by said phase difference calculating means, wherein said learning means learns said phase difference between said crank angle and said cam angle only when receiving said learning instruction from said learning instruction transmitting means.

2. A valve timing control system for an internal combustion engine as defined in claim 1, further comprising operating condition control means for controlling a speed of said internal combustion engine to within a predetermined range when said learning means receives said learning instruction from said learning instruction transmitting means, and said learning means learns said phase difference between said crank angle and said cam angle only when it confirms that said engine speed is within said predetermined range.

3. A valve timing control system for an internal combustion engine as defined in claim 2, wherein said predetermined range of said engine speed is from 1000 rpm to below 2000 rpm.

4. A valve timing control system for an internal combustion engine as defined in claim 2, wherein said predetermined range of said engine speed is from 1500 rpm to below 2000 rpm.

5. A valve timing control system for an internal combustion engine as defined in claim 2, wherein said predetermined range of said engine speed is a range of 1300 rpm±100 rpm.

6. A valve timing control system for an internal combustion engine as defined in claim 3, wherein, if a determination is made that said engine speed does not lie within said predetermined range, a correction is made on the basis of a difference between the present engine speed and a desired engine speed so that said engine speed is controlled to be within said predetermined range through feedback control using a correction value.

7. A valve timing control system for an internal combustion engine as defined in claim 3, wherein control of said engine speed is implemented by adjusting an opening degree of a valve installed in a passage for intaking the outside air into a cylinder of said internal combustion engine while bypassing a throttle valve.

* * * * *